United States Patent [19]
Ito et al.

[11] Patent Number: 5,832,325
[45] Date of Patent: Nov. 3, 1998

[54] STEREO CAMERA AND PRINTING SYSTEM FOR STEREOSCOPIC PHOTOGRAPHY

[75] Inventors: Kazumi Ito, Mitaka; Atsushi Yonetani, Hachioji, both of Japan

[73] Assignee: Olympus Optical Co., Ltd., Tokyo, Japan

[21] Appl. No.: 954,612

[22] Filed: Oct. 20, 1997

Related U.S. Application Data

[63] Continuation of Ser. No. 583,635, Jan. 5, 1996, abandoned.

[30] Foreign Application Priority Data

Jan. 9, 1995 [JP] Japan .................................. 7-001372

[51] Int. Cl.$^6$ .................................................. G03B 35/00
[52] U.S. Cl. ............................................................ 396/326
[58] Field of Search ................................... 396/324, 326, 396/377; 348/42, 49, 50; 352/52

[56] References Cited

U.S. PATENT DOCUMENTS

| | | | |
|---|---|---|---|
| 3,769,889 | 11/1973 | Wechsler | 355/22 |
| 4,063,265 | 12/1977 | Lo et al. | 354/294 |
| 4,086,585 | 4/1978 | Wah Lo et al. | 354/115 |
| 4,650,282 | 3/1987 | Wah Lo | 354/115 |
| 4,800,407 | 1/1989 | Wah Lo | 354/114 |
| 4,929,971 | 5/1990 | Imura et al. | 354/106 |
| 5,382,988 | 1/1995 | Nanjo | 351/206 |
| 5,465,128 | 11/1995 | Lo et al. | 354/114 |

FOREIGN PATENT DOCUMENTS 6-186642  7/1994  Japan .

OTHER PUBLICATIONS

Tadashi Kagami, "Stereoscopic photography system used in Konica & Kodak", Photographic Indu., vol. 52, No. 6, Jun. 1994, pp. 37–40.

*Primary Examiner*—Safet Metjahic
*Assistant Examiner*—Michael Dalakis
*Attorney, Agent, or Firm*—Cushman Darby & Cushman IP Group of Pillsbury Madison & Sutro LLP

[57] ABSTRACT

A stereo camera is designed to photograph images of an object on a plurality of frames and includes a device for securing focus detecting data of a distance to a chief object and a data recording device for recording parallax data derived from the focus detecting data or data capable of finding the parallax data on an image recording medium. A printing system for stereoscopic photography is such that images to be printed are recorded on the image recording medium by the stereo camera, and has a device for using the parallax data, as data independent of a photographic image, derived from the focus detecting data of the distance to the chief object or the data capable of finding the parallax data to automatically adjust the position of a combined image.

10 Claims, 4 Drawing Sheets

5,832,325

STEREO CAMERA AND PRINTING SYSTEM FOR STEREOSCOPIC PHOTOGRAPHY

This is a continuation of application Ser. No. 08/583,635, filed on Jan. 5, 1996, which was abandoned.

BACKGROUND OF THE INVENTION

1. Field of the Invention

This invention relates to a stereo camera in which images of an object are photographed on a plurality of frames of an image recording medium, such as a photographic film, through a plurality of optical systems, and a printing system for stereoscopic photography with the image recording medium.

2. Description of Related Art

As an apparatus for enjoying stereoscopic photography, a multi-ocular type using a lenticular lens is known. The apparatus of this type is such that images photographed through a plurality of optical systems are arranged in order, like stripes, behind the lenticular lens and are separately transmitted to right and left eyes by the behavior of the lenticular lens, and thereby a three-dimensional image can be viewed. Such an apparatus, however, sometimes causes a very disagreeable state of observation to an photographer because when he moves his eyes from side to side, the image shakes.

Stereoscopic photography excites a stereoscopic sensation because of a positional difference between images viewed with eyes. If there is the difference of a relative amount of shift between the positions of objects shifted back and forth in an image plane, the stereoscopic sensation can be secured. Thus, when a chief object is taken as a reference plane and shifted with respect to objects located before and behind the chief object, observation can easily be made. In this case, if the images of the chief object for right and left eyes are both printed at nearly the same position on a printing surface, the image of the chief object will not shake even though eyes are moved from side to side.

As seen from the above description, if a distance to the chief object in photography is known when the image is printed, such a proper image of printing that the photographer is satisfied will be obtained. However, according to a stereoscopic photography system now commercially available (for example, refer to: T. Kagami, "PHOTOGRAPHIC INDUSTRIES", SHASHIN KOUGYO PUBLISHING CO., LTD., June 1994, Vol. 52, No. 6, pp. 37–40), there is the problem that focus detecting data of the distance to the chief object is not recorded in photography, and thus where the images of the chief object are combined into a three-dimensional image in printing, the positional adjustment of the reference plane is required each time and is not easy in automatization. Consequently, it is extremely difficult to completely materialize the photographer's intention.

SUMMARY OF THE INVENTION

It is, therefore, an object of the present invention to provide a stereo camera and a printing system therefor in which parallax data derived from the focus detecting data of the distance to the chief object or data from which the parallax data can be found is recorded on an image recording medium in photography, so that the data is used to obtain a three-dimensional photograph in printing, thereby allowing automatic printing, and the three-dimensional photograph reflecting the photographer's intention can be secured.

In order to accomplish this object, according to the present invention, the stereo camera for photographing images of an object on a plurality of frames includes means for acquiring the focus detecting data of the distance to the chief object in photography and data recording means for recording, on an image recording medium, parallax data derived from the focus detecting data or data from which the parallax data can be found. In this way, the parallax data in photography or the data from which the parallax data can be found is recorded on the image recording medium as data independent of a photographic image.

Further, the stereo camera of the present invention is designed so that a plurality of optical systems having nearly the same specification are arranged so that their optical axes are practically parallel. By this arrangement, it is possible to photograph images with parallax at the same time.

Still further, the stereo camera of the present invention is such that the means for acquiring the focus detecting data includes an automatic focus detector. Thus, the focus detecting data of the distance to the object can be found automatically to obtain the parallax data.

Still further, the stereo camera of the present invention is such that the means for acquiring the focus detecting data is provided independent of a photographing optical system. Thus, the number of degrees of camera design freedom is increased.

Still further, the stereo camera of the present invention is such that the data recording means records data as optical marks. In this way, it is possible to easily record the parallax data or the data from which the parallax data can be found, on a medium like an existing silver halide film.

Still further, the stereo camera of the present invention is such that the data recording means magnetically records data. In this way, the data can be recorded on a magnetic recording medium.

Still further, the stereo camera of the present invention is such that the data recording means distinguishes between frames for stereoscopic photography and for ordinary photography. Thus, automatic switching to a printing system becomes possible.

Still further, the stereo camera of the present invention is designed so that means for calculating the parallax data derived from the focus detecting data is made to approximate the parallax data by the equation:

$$d = Fb\,W/(D - Fb) \qquad (1)$$

where D is a distance from the intersection of the center line, which is the perpendicular bisector of a segment connecting the principal points of optical systems on right and left sides, with an image surface to the chief object located on the center line, W is a distance from the center line to the optical axis of each of the optical systems, Fb is a distance from the secondary principal point of each optical system to the image surface, and d is parallax data (a distance from the center of the frame for photography by each optical system to an image of the chief object located on the center line).

In this way, simple and practical parallax data can be obtained.

The printing system for stereoscopic photography in the present invention is equipped with means for using the parallax data derived from the focus detecting data of the distance to the chief object or the data from which the parallax data can be found, as data independent of the photographic image, to adjust automatically the position of a combined image. Thus, by using the parallax data or the data for finding the parallax data, the position of the combined image can be adjusted automatically.

Further, the printing system of the present invention has means for reading out data capable of distinguishing between frames for stereoscopic photography and for ordinary photography and means for separately printing three-dimensional and common photographs. It is therefore possible to print out the film by deciding automatically as to whether the frame is for stereoscopic photography or for ordinary photography.

Still further, the printing system of the present invention is constructed so that the means for adjusting automatically the position of the combined image can shift the relative positions of the image recording medium and an enlarging lens for printing on the plane parallel to a printing frame by an amount X found from Eq. (1) and the following equations:

$$d' = W'/\beta \quad (2)$$

where $\beta$ is an enlarging magnification, W' is a distance from the center line drawn perpendicularly from the center of printing paper to the optical axis of the enlarging lens, and d' is the amount of shift of an image located at the center on the three-dimensional photograph from the optical axis of the enlarging lens.

$$X = d' - d \quad (3)$$

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
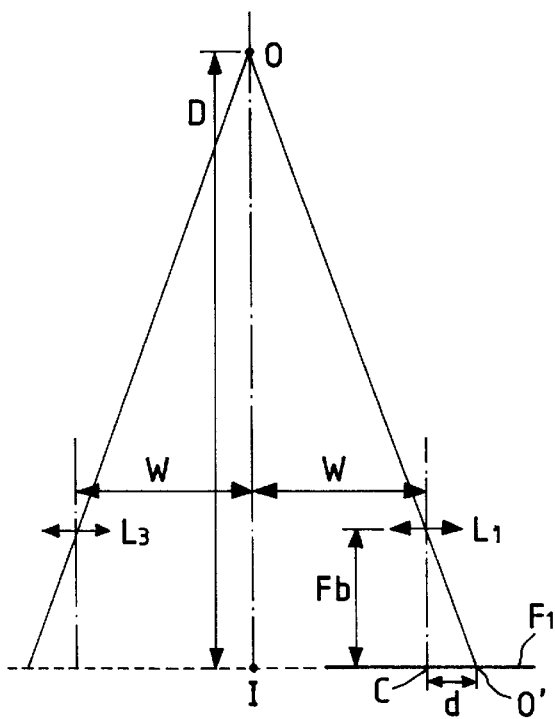
FIG. 1 is a view for explaining the fundamental principle of an optical arrangement of the stereo camera according to the present invention.
Figure 2:
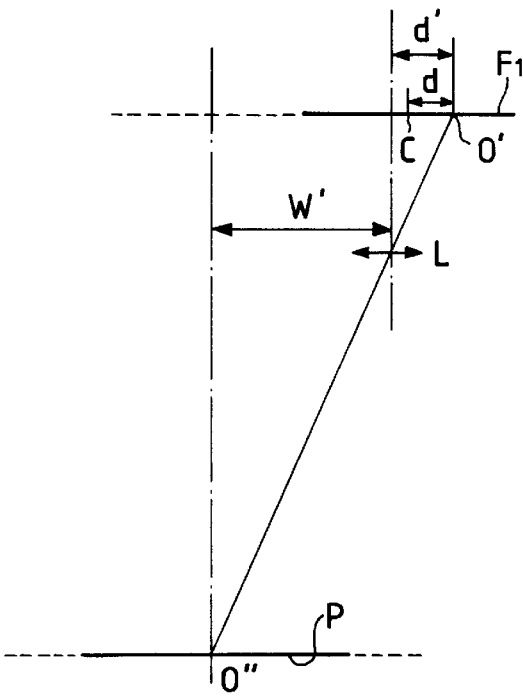
FIG. 2 is a view for explaining the fundamental principle of an optical arrangement of the printing system for stereoscopic photography according to the present invention.

Before undertaking the description of the embodiments, it will be expedient to explain a basic consideration of the present invention in reference to FIGS. 1 and 2.

The camera constructed as shown in FIG. 1 is actually equipped with three photographing optical systems, by which images of an object are photographed on three frames of an image recording medium, for example, of a film, at the same time. For simplicity, the optical systems are shown only as optical systems $L_1$ and $L_3$ on right and left sides in the case where the camera is directed toward the object, and an optical system ($L_2$) situated in the middle between them is omitted. For the image recording medium, only a frame $F_1$ for photography by the optical system $L_1$ is shown. The three optical systems have almost the same specification and are arranged so that their optical axes are nearly parallel.

In the camera constructed as mentioned above, the focus detecting data of the distance to the object is first input in proper data processing means in the camera by focus detecting means housed in the camera or by another focus detecting means including an eye measurement. The distance to the object measured in this case is represented by D. As illustrated in FIG. 1, when the perpendicular bisector of a segment connecting the principal points of the optical systems $L_1$ and $L_3$ is taken as a center line, the intersection of the center line with the image surface is designated by I; a point spaced a distance D apart along the center line from the intersection I by O; a distance from the center line to the optical axis of each of the optical systems $L_1$ and $L_3$ by W; and a distance from the secondary principal point of each optical system to the image surface by Fb. here, since the optical systems $L_1$ and $L_3$ are symmetrical with respect to the center line, a description will be made of only the optical system $L_1$ on the right side. When an intersection C of the optical axis of the optical system $L_1$ with the image surface is taken as the middle point of the frame $F_1$, the distance d from the intersection C to an image O' of the point O projected on the image surface is found by Eq. (1).

The value d derived from Eq. (1) is the amount of shift from the middle position of the frame $F_1$ where a three-dimensional photograph is obtained, and becomes parallax data at the distance D to the chief object. This value is recorded on the image recording medium like the film. For a recording way, where the image recording medium is an ordinary silver halide film, the value may be optically recorded outside the frame, or in the case of a magnetically recordable film, it may be magnetically recorded outside the frame. Further, in the case of a medium for storing the value obtained by an electron camera, it is possible to easily record the value in accordance with various media. In these cases, in stead of the parallax data d, data capable of finding the parallax data d, for example, the distances Fb, D, and W, may be recorded.

Next, reference is made to the case where the parallax data is used to print out the combined image. The printing device of this type in which the image recording medium is a film, for example, as shown in Japanese Patent Preliminary Publication No. Hei 6-186642, is designed so that the positions of the film, enlarging lens, and printing paper can be relatively adjusted in a horizontal direction. FIG. 2 depicts only the arrangement of the optical system of such a device and is drawn so that when a perpendicular line drawn from the middle position of printing paper P is take as a center line, the center line coincides with that shown in FIG. 1.

In FIG. 2, since the enlarging magnification of the enlarging lens L is $\beta$ and the distance between the center line of the printing paper P and the optical axis of the enlarging lens L is W', the amount of shift d' of the chief object image O' to be located at the center on the three-dimensional photograph (printing paper) from the optical axis of the enlarging lens L is derived from Eq. (2). Thus, the diagram of FIG. 2 shows the case where the center C of the frame $F_1$ is shifted by the distance of d'−d from the optical axis of the lens L to the right of the figure. In this way, the image O' can be printed out, as an image O'', at the middle position of the printing paper P by the lens L.

Since, as mentioned above, the parallax data is recorded on the image recording medium in photography and the calculation of the amount of shift d' in printing is extremely simple, the amount of shift d'−d is easily found, and thereby the relative positions of the lens L and the frame $F_1$ can be adjusted automatically. In this way, the images of the chief object situated at the point O are printed out at nearly the same position on the printing surface, and thus, even when eyes are moved from side to side in observation, a stable, three-dimensional image can be viewed. Also, in the above description, the chief object is taken as a reference position to secure the three-dimensional photograph, but where a stereoscopic sensation is taken into account, rather than the shake of the image, it can be enhanced if the position of the point O is set behind the chief object in order to secure a stereoscopic effect.

The embodiments of the present invention will be explained in detail below. At the beginning, reference is made to one embodiment shown in FIGS. 3 to 5. In these figures, like symbols indicate like elements with respect to FIGS. 1 and 2.

Figure 3:
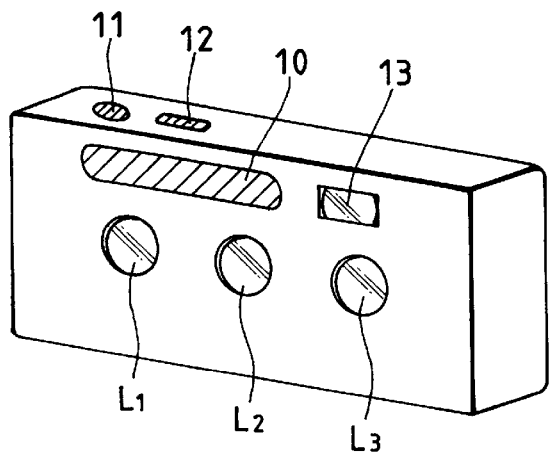
FIG. 3 is an appearance view showing an example of the stereo camera of the present invention.

The camera shown in FIG. 3 is equipped with the photographing optical systems $L_1$, $L_2$, and $L_3$, which are arranged so that their optical axes are nearly parallel. It is needless to say that respective shutters are placed close to the photographing optical systems $L_1$, $L_2$, and $L_3$. In front of the camera are arranged the light emitting and receiving sections of an automatic focus detector 10, which controls the lens shifting distances of the photographing optical systems $L_1$, $L_2$, and $L_3$ in response to its measuring results and outputs a focus detecting signal to a data processor which will be described later.

For ordinary photography, when a release button 11 is pushed, an image is photographed on each frame of the film F by the photographing optical system $L_2$. For stereoscopic photography, on the other hand, when a button 12 for stereoscopic photography is pushed, the film F is fed by one frame so that three unexposed frames are respectively situated behind the photographing optical systems $L_1$, $L_2$, and $L_3$ and a lamp indicates in a finder 13 that a stereoscopic photography mode is now followed. When photography is completed, the film F is fed automatically by two frames, so that photography is restored to an ordinary photography mode.

Figure 4:
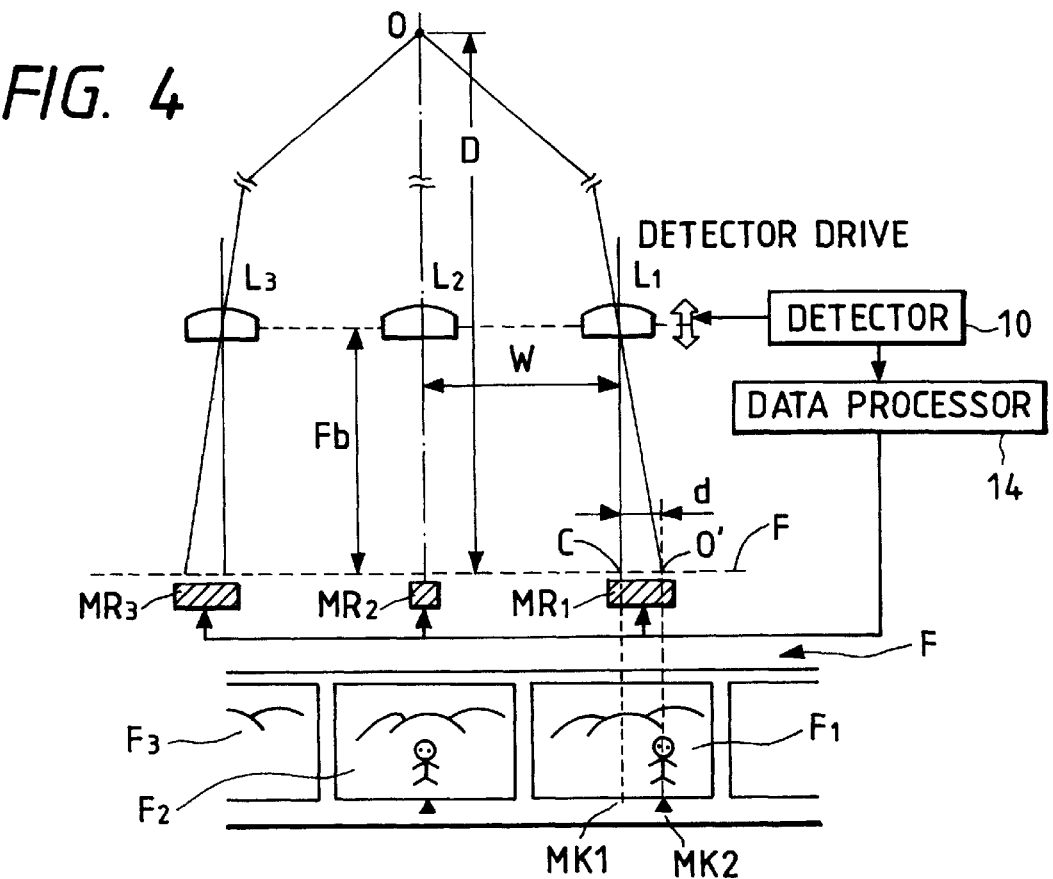
FIG. 4 is an explanatory view showing the optical arrangement of one embodiment of the stereo camera equipped with an optical recorder in the present invention.

The stereoscopic photography mode, as shown in FIG. 4, is such that a data processor 14 actuates mark recorders $MR_1$, $MR_2$, and $MR_3$ in response to the focus detecting signal from the automatic focus detector 10 and provides optical marks outside respective frames $F_1$, $F_2$, and $F_3$. These marks include a mark $MK_1$ indicated at the middle position of each frame in a longitudinal direction of the film and a mark $MK_2$ provided at a predetermined position in accordance with the focus detecting data. The distance d between the marks $MK_1$ and $MK_2$, as mentioned above, is the value having been found by Eq. (1). The frame $F_2$ has the mark $MK_2$ superimposed on the mark $MK_1$, and the frame $F_3$ has the mark $MK_2$ at a position symmetrical with respect to the frame $F_1$.

Figure 5:
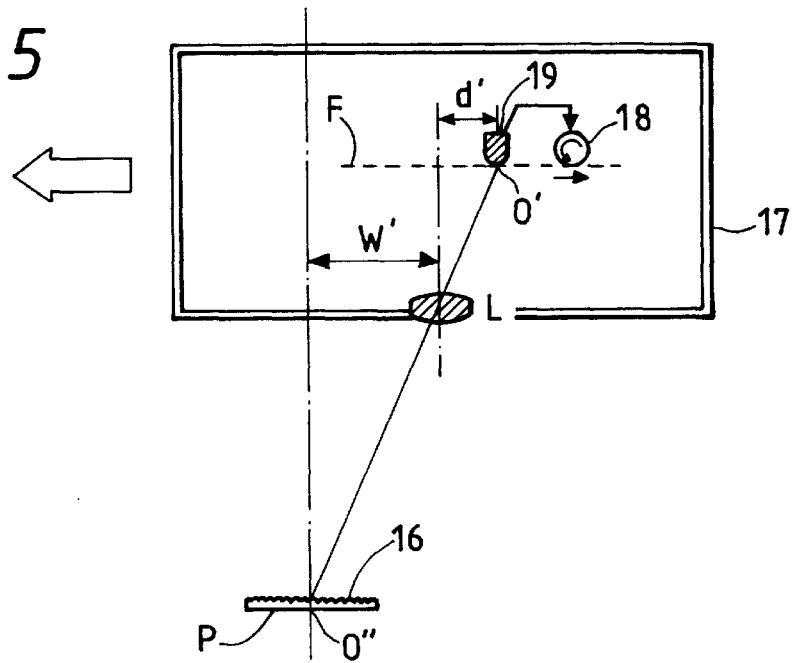
FIG. 5 is an explanatory view showing one embodiment of the printing system with the film of the camera having the optical system shown in FIG. 4.
Figure 6:
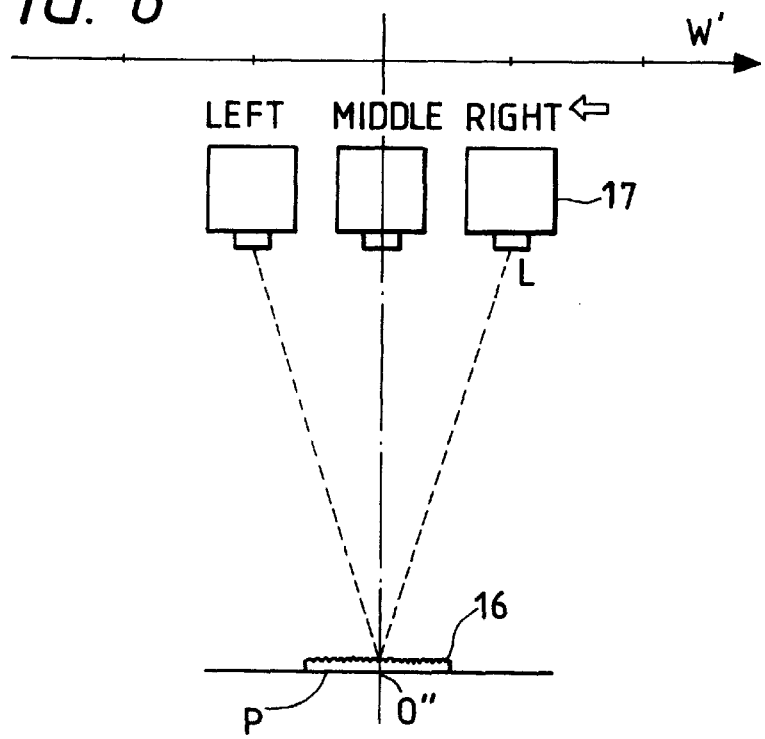
FIG. 6 is a view showing a state of movement of a casing shown in FIG. 5.

Thus, in the camera of the embodiment, the focus detecting data derived from the automatic focus detector 10 is converted by the data processor 14 into the parallax data d of the chief object image, and in accordance with the converted values, the mark recorders $MR_1$, $MR_2$, and $MR_3$ provide the marks on the film F. As an example of the mark recorders $MR_1$, $MR_2$, and $MR_3$, a plurality of small light sources, such as LEDs, are arranged in the direction of the feed of the film F, and a light source situated at a position corresponding to the parallax data d is emitted to provide the mark on the film F. Although, in FIG. 4, the film F is exposed from the back side thereof, it may be exposed from the front side. Moreover, after a single light source is moved, for example, by a linear motor, to a position corresponding to the amount of shift, the film F may be exposed. This movement may be mechanically associated with the lens shifting distance of each photographing optical system.

Where an image is printed out on the printing paper P by the printing system shown in FIG. 5, a lenticular lens 16 is placed in front of the printing paper P, and a casing 17 is moved in the direction of an arrow to make exposure several times while changing the distance W'. FIG. 6 shows the state of movement of the casing 17. In FIG. 5, the casing 17 is located at the "right" position shown in FIG. 6 to print the frame $F_1$. While the casing 17 is moved, the frame $F_2$ is printed at the "middle" position and then the frame $F_3$ at the "left" position, thereby obtaining a combined three-dimensional photograph. The casing 17 may, of course, be fixed to move the printing paper P. The limit of the value of the distance W' depends on an observable range of the three-dimensional photography. In the casing 17 are arranged the film 17 already developed, a film feeder 18, and a mark detector 19, including a light source for printing exposure, not shown.

When exposure is made several times as mentioned above, the amount of shift d' varies according to a change of the distance W'. Since, as already stated, the amount of shift d' of the film F in terms of the position of the enlarging lens L is found by Eq. (2), it is easily calculated each time. Thus, the position of the mark detector 19 is changed to the position where the value of d'−d is satisfied, in association with the change of the distance W'. Alternatively, the mark detector 19 is constructed with a plurality of detecting elements arranged in the longitudinal direction of the film F and an element corresponding to the amount of shift d'−d is made to be detectable each time. In this way, the position of the frame $F_1$ fed by the film feeder 18 is determined by the detection of the mark.

According to the printing system of the embodiment, as mentioned above, the value of the amount of shift d' is easily calculated and the parallax data d is previously marked on the film F in photography. Consequently, no problem is caused in particular by adjusting the film position in each exposure and printing the film on the printing paper, and it is easy to perform this operation automatically. Furthermore, a developed film is provided with the marks, and thus, even when the changeover between ordinary photography and stereoscopic photography is required as in the camera of FIG. 3, whether corresponding marks are provided in printing is detected automatically. It is therefore easy to make a printing system that can continuously print common and three-dimensional photographs.

Figure 7:
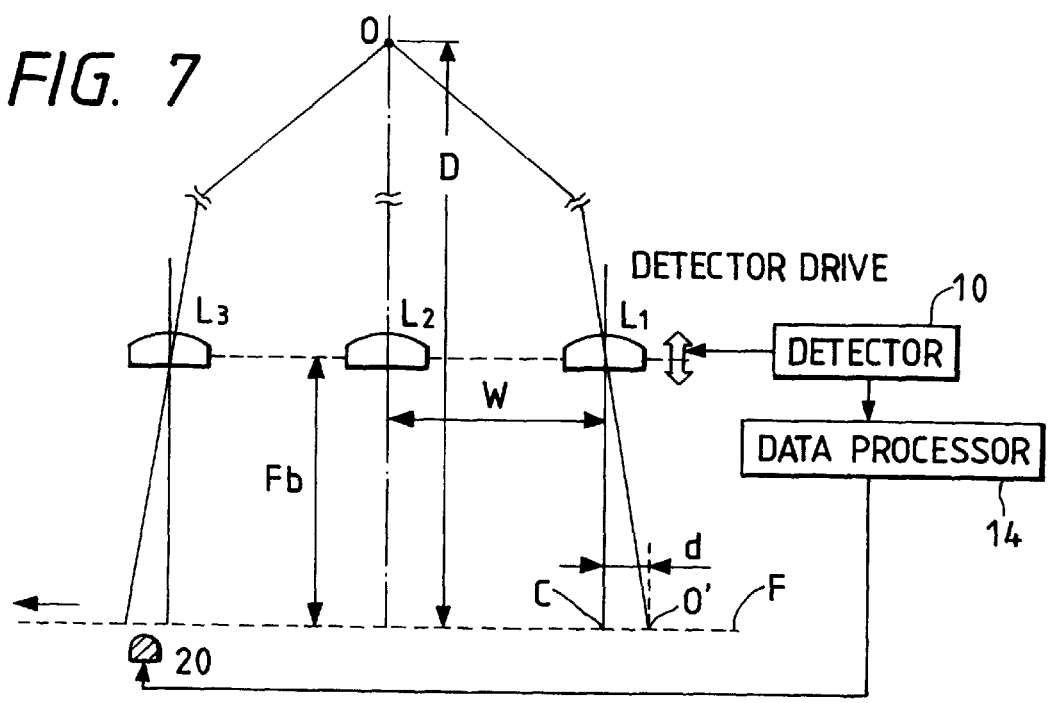
FIG. 7 is an explanatory view showing the optical arrangement of another embodiment of the stereo camera equipped with a magnetic recorder in the present invention.
Figure 8:
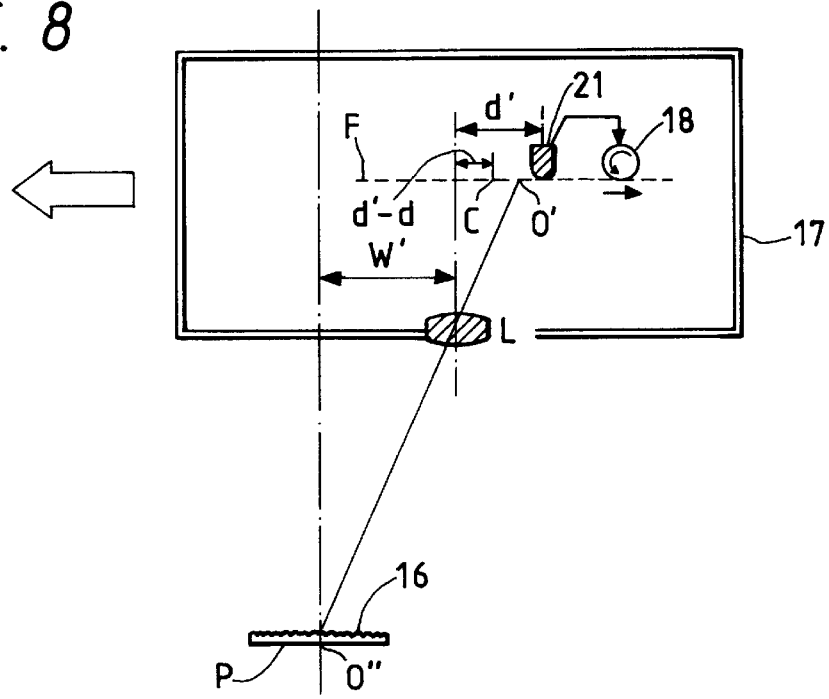
FIG. 8 is an explanatory view showing another embodiment of the printing system with the film of the camera having the optical system shown in FIG. 7.

Next, reference is made to another embodiment shown in FIGS. 7 and 8. These figures correspond to FIGS. 1 and 2 and FIGS. 4 and 5, and are explanatory views of the camera and the printing system, respectively. Also, like numerals and symbols indicate like elements with respect to FIGS. 4 and 5. As the outline of the camera, the diagram of FIG. 3 can also be applied to this case.

For the stereoscopic photography mode in this embodiment, it is the same as in the above description that the parallax data d is calculated from Eq. (1) in accordance with the focus detecting data. In the embodiment, a magnetic coating is applied outside each frame in the longitudinal direction of the film F (at the place where the marks $MK_1$ and $MK_2$ are provided in the former embodiment), and a magnetic recorder 20 is placed on the back of the frame $F_3$ (not shown) exposed through the optical system $L_3$ on the left side. The parallax data d corresponding to each frame is thus recorded when the film is taken up after photography and each frame passes the magnetic recorder 20. As a magnetic recording way, the analog or digital system is available, but the digital system is more desirable in view of the degradation of data. Also, although in this embodiment the magnetic coating is applied outside the frame, it is sometimes used over the entire surface of the film.

As shown in FIG. 8, the casing 17 of the printing system contains a magnetic reader 21 for reading out the data recorded on the film F to position the film F. In the embodiment also, when the three-dimensional photograph is printed out, the casing 17 is moved to the left to make exposure several times while changing the distance W'. If the amount of change of the distance W' is determined before printing, since the distance d' for each exposure is already found from Eq. (2), the adjusting shift value d'−d corresponding to each distance W' will be determined when the magnetic reader 21 has derived the data of the distance d from the film F before an initial exposure. Thus, in each exposure, the film F is moved, by the film feeder 18, to the position where the adjusting shift value d'−d is satisfied, and the relative positions of the optical axis of the enlarging lens L and the image O' are adjusted.

In this case also, as will be understood from the above explanation, the printing system can be automatized with great ease. Moreover, the magnetic recording system, which is suitable for recording of many data compared with the optical recording system, can be made to properly record data relative to the stereoscopic photography mode, a combination of frames for the three-dimensional photograph, and the aspect ratio of the frame, and can use the data to automatize the printing system. This system is thus extremely advantageous.

Figure 9:
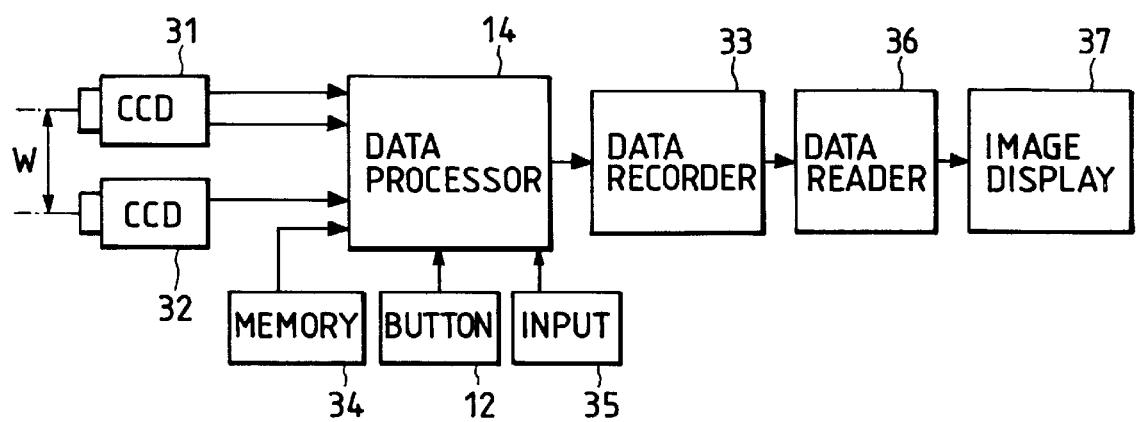
FIG. 9 is an explanatory view showing a photographic and reproducing system of stereoscopic photography in the case where an electron camera is used.

Subsequently, a description is given of the case where the three-dimensional photograph is obtained by an electron camera housing an image sensor in reference to FIG. 9. For photography, two CCD cameras 31 and 32 having the photographing optical systems of nearly the same specification are arranged so that the optical axes of the optical systems are practically parallel. Only one camera may, of course, be used. The image data of the two cameras are introduced into the data processor 14. The focus detecting data measured by the automatic focus detector is also introduced from the camera 31 into the data processor 14.

The data of the distances D, W, and Fb, or an amount of shift d" given by the equation d"=Fb W/{2(D−Fb)} from the data is recorded, along with the image data, in a recording medium by a data recorder 33. The recording media used in this case are available in a solid-state memory, magnetic disk, magnetic tape, optical disk, and photomagnetic disk. In FIG. 9, reference numeral 34 denotes a memory for providing the data processor 14 with the data of the distances W and Fb and 35 denotes a manual input device of the distance to the chief object.

To make the three-dimensional image, image data read out from the data recorder 33 by a data reader 36 are displayed on an image display 37 such as an LCD or CRT. In this case, the images corresponding to the point O' in FIG. 1 are displayed at nearly the same position in accordance with the data or the amount of shift d, so that the images of the object point lying at the distance to the chief object do not shake and are outputted on a video display terminal combining the image display, such as the LCD and CRT, and a lenticular lens or printing-out paper with a lenticular lens.

What is claimed is:

1. A stereo camera comprising:
    a photographing optical system including a plurality of photographing lens systems of substantially equal specification which are arranged such that optical axes thereof are parallel to one another and which form a plurality of images of an object in a plurality of frames on an image recording medium, said plurality of images having parallax therebetween;
    means for obtaining range data during photographing operation, said range data including a distance from said stereo camera to a chief object point in the object; and
    data recording means for recording parallax data which is calculated based on the range data and which represents the parallax between the plurality of images formed by said plurality of photographing lens systems or parallax deriving data from which the parallax data can be derived on the image recording medium.

2. A stereo camera according to claim 1, wherein means for calculating the parallax data based on the range data is constructed to approximate the parallax data using an equation:

$$d = Fb\,W/(D-Fb)$$

where D is a distance from an intersection of a photographic center line, which is a perpendicular bisector of a segment connecting principal points of a rightmost one and a leftmost one of said plurality of photographing lens systems, with an image surface to the chief object point located on the photographic center line, W is a distance from the photographic center line to an optical axis of each of said photographing lens systems, Fb is a distance from a secondary principal point of each photographing lens system to the image surface, and d is the parallax data which is defined as a distance from a center of a frame in which the image of the object is formed by each photographing lens system to an image of the chief object point formed in said frame.

3. A printing system for stereoscopic photography for printing a photograph recorded on an image recording medium by a stereo camera comprising:
    a photographing optical system including a plurality of photographing lens systems of substantially equal specification which are arranged such that optical axes thereof are parallel to one another and which form a plurality of images of an object in a plurality of frames on an image recording medium, said plurality of images having parallax therebetween,
    means for obtaining range data during photographing operation, said range data including a distance from said stereo camera to a chief object point in the object; and
    data recording means for recording parallax data which is calculated based on the range data and which represents the parallax between the plurality of images formed by said plurality of photographing lens systems or parallax deriving data from which the parallax data can be derived on the image recording medium;
said printing system comprising:
    an adjusting means for performing positional adjustment of said plurality of frames of the image recording medium when said plurality of images of the object are printed as a combined image, the positional adjustment of said plurality of frames being performed based on said parallax data or said parallax deriving data recorded on said image recording medium.

4. A printing system according to claim 3, further comprising an enlarging optical system for enlarging and projecting said plurality of images, which are recorded on the image recording medium, onto a printing surface, wherein said adjusting means shifts relative positions of the image recording medium and said enlarging optical system on a plane parallel to a printing frame by an amount X derived from equations:

$$X = d' - d$$

$$d' = W'/\beta$$

where d' is an amount of shift of the image of the chief object point on said image recording medium from an optical axis of said enlarging optical system, the image of the chief object point being designed to be projected at a center of the printing surface, $\beta$ is an enlarging magnification of said enlarging optical system, W' is a distance from a printing center line, which is a normal to the printing surface at the center thereof, to the optical axis of said enlarging optical system, and d is the parallax data which is defined as the distance from the center of the frame of the image recording medium to the image of the chief object point formed in the same frame, said parallax data being recorded on the image recording medium or being approximated, using the parallax deriving data recorded on the image recording medium, by the equation:

$$d = Fb\ W/(D - Fb)$$

where D is the distance from the intersection of the photographic center line, which is a perpendicular bisector of a segment connecting the principal points of the rightmost one and the leftmost one of said plurality of photographing lens systems, with the image surface of said stereo camera to the chief object point located on the photographic center line, W is the distance from the photographic center line to the optical axis of each of said photographing lens systems, Fb is the distance from the secondary principal point of each photographing lens system to the image surface of said stereo camera.

5. A stereo camera according to claim 1, wherein said means for obtaining range data includes an automatic focus detector.

6. A stereo camera according to claim 1, wherein said means for obtaining range data is independent of said plurality of photographing lens systems.

7. A stereo camera according to claim 1, wherein said data recording means records optical marks on the image recording medium.

8. A stereo camera according to claim 1, wherein said data recording means magnetically records the data on the image recording medium.

9. A stereo camera according to claim 1, wherein said data recording means distinguishes between a frame for stereoscopic photography and a frame for ordinary photography to record the data.

10. A printing system for stereoscopic photography according to claim 3, further comprising means for reading out data recorded on the image recording medium to distinguish between a frame for stereoscopic photography and a frame of ordinary photography and means for printing frames separately for stereoscopic photography and ordinary photography.

* * * * *